April 17, 1962  S. ALLEN  3,029,602
COMBUSTION CHAMBERS
Filed June 16, 1958
3 Sheets-Sheet 1

INVENTOR
SIDNEY ALLEN.
ATTYS.

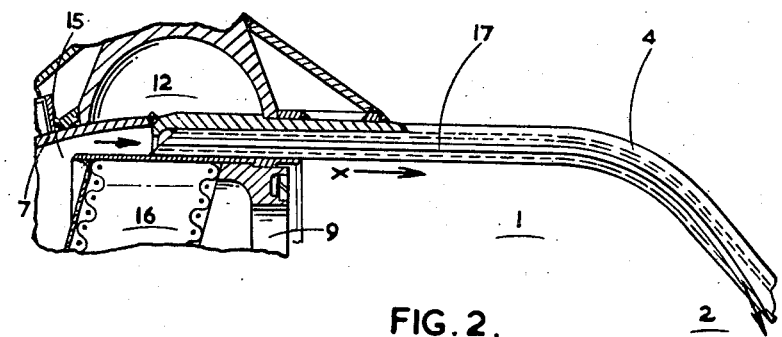
FIG. 2.
FIG.2a.
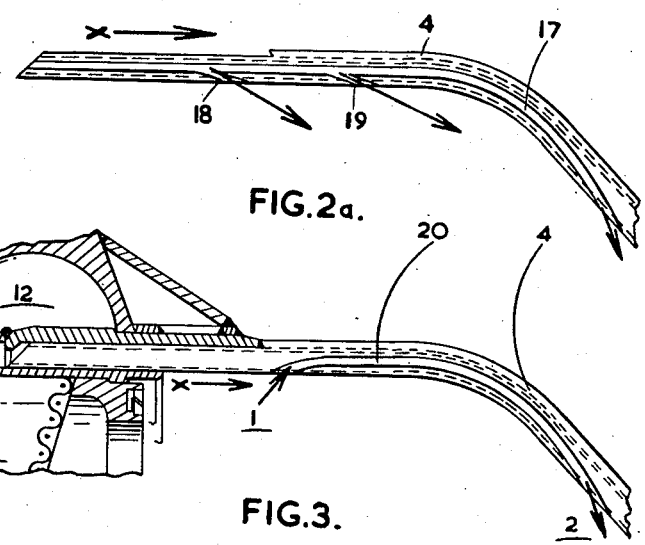
FIG.3.
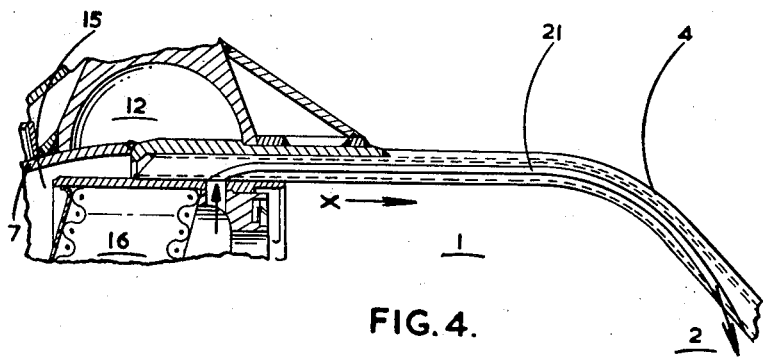
FIG.4.

April 17, 1962  S. ALLEN  3,029,602
COMBUSTION CHAMBERS

Filed June 16, 1958  3 Sheets-Sheet 3

INVENTOR
SIDNEY ALLEN
Mawhinney & Mawhinney
ATTYS.

United States Patent Office 3,029,602
Patented Apr. 17, 1962

3,029,602
COMBUSTION CHAMBERS
Sidney Allen, Coventry, England, assignor, by mesne assignments, to Bristol Siddeley Engines Limited, Bristol England, a British company
Filed June 16, 1958, Ser. No. 742,431
Claims priority, application Great Britain June 21, 1957
6 Claims. (Cl. 60—39.69)

The invention relates to a combustion chamber of the kind bounded by a plurality of longitudinally extending tubes united side-by-side and each having side walls abutting those of adjacent tubes. Although not limited in this respect, the invention has particular reference to such a combustion chamber (e.g., a rocket motor) in which the bores of at least some of the tubes are interconnected for a fluid (which may be a combustion component) to flow therethrough. In this kind of combustion chamber the flow through each of the interconnected tubes may be in the same direction or the flow may be in one direction through some of the tubes and in the reverse direction through others.

The invention has among its objects to enable the cooling characteristics of the combustion chamber wall, and/or the conditions for combustion within the chamber to be modified or controlled.

According to the invention at least one of the abutting pair of side walls of two adjacent tubes is externally formed with a groove which co-operates with the other wall of the abutting pair to provide a through-way.

The through-way may be formed as a fluid-tight duct by sealingly connecting the abutting pair of side walls on each side of the groove and along the length thereof. Alternatively the through-way may contain a pipe extending substantially through the length of the through-way.

The groove may extend substantially longitudinally of the tube and may be in each wall of an abutting pair. The grooves may be of substantially semi-circular or angular cross-section.

The through-way may be open at each end thereof to the interior of the combustion chamber and arranged to convey fluid from one position in the combustion chamber to another. Instead, each end of the through-way may be open to the exterior of the combustion chamber and arranged to convey fluid introduced thereto at one position in the combustion chamber wall to another position. These two arrangements are particularly, but not exclusively, suitable for cooling purposes, when a cool fluid is to be conveyed to a hotter region.

The through-way may alternatively be open at one end to the interior of the combustion chamber and at the other end to the exterior of the combustion chamber. This arrangement is particularly suitable for fuel injection purposes.

By way of example, a rocket motor combustion chamber and modifications thereof will now be described with reference to the drawings in which:

FIGURE 2 is a portion of FIGURE 1 drawn to a larger scale;

FIGURE 2A shows a modification of a portion of FIGURE 2;

FIGURE 3 is a view similar to FIGURE 2 showing a second modification;

FIGURE 4 is a view similar to FIGURE 2 showing a third modification;

Figure 1:
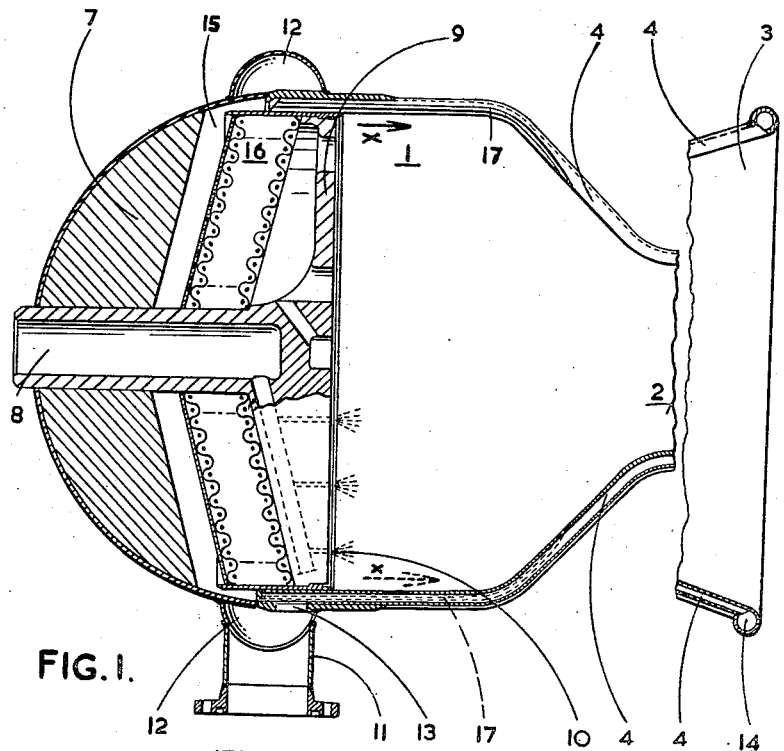
FIGURE 1 is a part-sectional view of the combustion chamber.
Figure 8:
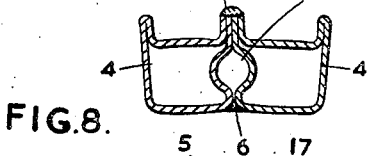

The rocket motor combustion chamber shown in FIGURE 1 comprises a substantially cylindrical combustion region 1 merging into a throat 2 which afterwards diverges to form an expansion nozzle 3, the combustion region, throat and expansion nozzle having a common wall of substantially circular cross-section and formed from tubes 4 having flat side walls arranged side-by-side and welded together at 5 and 6, as shown in FIGURE 8. The combustion chamber has a closed upstream end 7 through which passes a fuel supply pipe 8 leading to a fuel distribution plate 9 having a plurality of fuel orifices 10. Hydrogen peroxide is supplied to the combustion chamber through a supply pipe 11 and an external annular supply passage 12 positioned at the upstream end of the combustion chamber and connected through openings of which one is shown at 13 to alternate tubes 4 which extend to an annular header 14 at the downstream end of the expansion nozzle. Hydrogen peroxide returns from the header 14 through the intermediate tubes 4 to a catalyst chest or chamber 15 at the upstream end of the combustion chamber. The flow of hydrogen peroxide through the tubes cools the wall of the combustion chamber. Some of the returned hydrogen peroxide passes through a catalyst unit 16 which is disposed in the chamber 15 to become decomposed and afterwards mixed with the fuel in the combustion region 1. A proportion of the returned hydrogen peroxide however, flows in the direction of arrows X through through-ways constituted by fluid-tight ducts 17 formed between two adjacent tubes 4. The ducts 17 extend from the chest 15 to the region of the throat 2 and they deliver hydrogen peroxide to that region. A duct 17 may be formed between every tube 4 and the adjacent tubes or between certain adjacent tubes 4 only. The position of ducts 17 may be seen more clearly from FIGURE 2.

The ducts 17 may be modified as shown in FIGURE 2A by having additional branches 18 and 19 which communicate with the interior of the combustion chamber between the combustion region 1 and the throat 2.

In FIGURE 3, ducts 20, similar to 17, extend from an upstream position in the combustion region 1 to the region of the throat 2 whereby cooled combustion products are introduced into the throat region.

FIGURE 4 shows a variation of FIGURE 1 in which ducts 21, similar to 17, extend between the downstream end of the catalyst unit 16, whereby decomposed hydrogen peroxide is delivered to the throat 2.

In any of the above-mentioned arrangements, where the ducts 17, 20 or 21 deliver cooled fluid to the region of the throat 2, the cooled fluid forms a layer between the wall of the throat and the hot combustion gases which pass through the throat. The outlets of the ducts are inclined in the downstream direction of the combustion chamber thereby to encourage cooling adjacent the throat wall.

Figure 5:
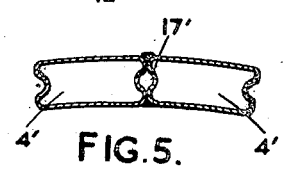
FIGURES 5-9 show pairs of tubes of various cross-section.
Figure 6:
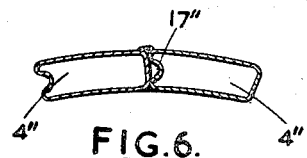
Figure 7:
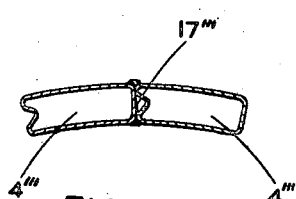
Figure 9:
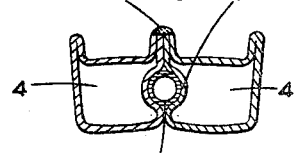

FIGURES 5 to 9 show tubes such as 4 of various cross-section. In FIGURE 5, two substantially rectangular tubes 4' with grooves in each of the adjacent side walls are brazed or welded together at their inner and outer longitudinal edges, whereby the two grooves together form a duct such as 17'. In FIGURE 6 one only of the adjacent walls of the tubes 4'' is formed with a groove so that the duct 17'' is substantially D-shaped. FIGURE 7 is similar to FIGURE 6, except that the groove in the one side wall of each tube 4''' is of angular form thereby forming a duct 17''' of substantially triangular cross-section. FIGURE 8 shows tubes 4 as shown in FIGURES 1 and 2 which together form ducts 17 sealed by welds 5 and 6. FIGURE 9 shows a variation of FIGURE 8 in which each of the through-ways or ducts contain a pipe 22. In view of the provision of pipe 22 the weld 6 can be dispensed with.

Figure 10:
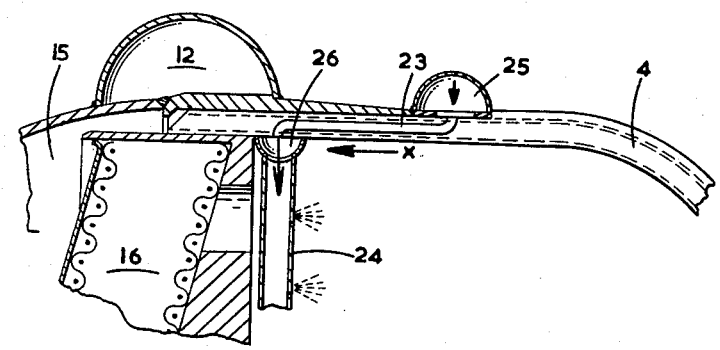
FIGURE 10 is a view similar to FIGURE 2 but showing another modification.
Figure 11:
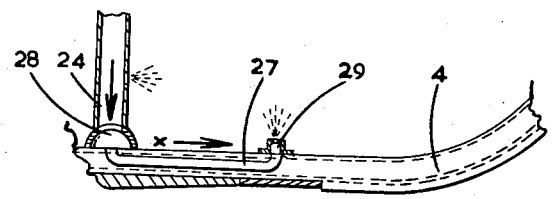
FIGURE 11 is a view diametrically opposite that shown in FIGURE 10 and showing yet another modification.

In FIGURES 1 to 4, the ducts 17, 20 or 21 have been used to convey comparatively cooler fluid to a hotter region e.g., for throat or wall cooling purposes. FIGURE 10 shows the use of a duct 23 similar to ducts 17, 20 or 21 for introducing fuel to a fuel distribution pipe 24 instead of through the supply pipe 8. The duct 23 interconnects an external fuel header 25 with an internal fuel header 26 communicating with the fuel distribution pipe 24. FIGURE 11 shows how a duct such as 27 may be used to convey a fluid, e.g., fuel, from one region of the combustion chamber to another. In FIGURE 11 there is shown the diametrically opposite end of the fuel distribution pipe 24 shown in FIGURE 10. An internal header 28 is connected by ducts 27 to a secondary fuel injector 29 further downstream from the fuel distribution pipe 24. Although this use of the ducts 27 has been shown in conjunction with the fuel distribution pipe 24, the ducts 27 can be positioned to convey fluid, e.g., fuel, between any two internal positions in the length of the combustion chamber.

Figure 12:
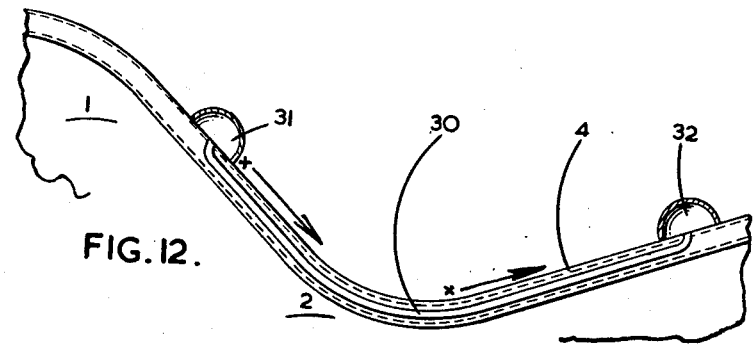
FIGURE 12 is a sectional view of part of the combustion chamber wall in the region of the throat and showing a further modification.

FIGURE 12 shows how ducts 30 similar to any of the previously mentioned ducts, such as 17, may be used to effect a communication between two external headers such as 31 and 32. In this example the ducts 30 are used for a secondary coolant for the wall of the throat region 2. Secondary coolant is introduced through the external header 31 and is conveyed by ducts 30, in the direction of arrows X, to the external outlet header 32, or vice versa.

From the above examples of the invention, it will be evident that by the provision of ducts, such as 17, formed between two adjacent tubes, such as 4, a fluid may be conveyed from one position in the combustion chamber to another position, either position being open internally or externally of the combustion chamber. The fluid so conveyed may be used for cooling purposes or the ducts may be used in another way, such as for fuel injection. Although the ducts, such as 17, which have been described in the above examples extend longitudinally of the tubes 4, the ducts may extend, transversely of the tubes by forming the grooves, which define the ducts, transversely of the tube walls. Although only the duct 17, as shown in FIGURE 2A, is provided with branches intermediate its length, any of the ducts 20, 21, 23, 27, 30 may have similar branches.

What I claim as my invention and desire to secure by Letters Patent of the United States is:

1. A combustion device comprising
   (a) a combustion chamber,
   (b) a catalyst chamber upstream of the combustion chamber,
   (c) said combustion chamber having a throat,
   (d) a set of longitudinally extending tubes encircling said chambers and throat for the reception of an oxidant and discharge of said oxidant into said catalyst chamber,
   (e) a second set of longitudinally extending tubes disposed in alternating arrangement with the tubes of the first set,
   (f) each tube of said second set having an inlet communicating with said catalyst chamber and an outlet opening into said throat, and
   (g) means for supplying fuel to said combustion chamber.

2. A combustion device comprising
   (a) a combustion chamber including
   (b) a catalyst chamber upstream of the combustion chamber,
   (c) a set of longitudinally extending tubes forming the periphery of the combustion chamber and adapted to receive an oxidant and discharge said oxidant into said catalyst chamber,
   (d) means for supplying fuel to said combustion chamber, and
   (e) a second set of longitudinally extending tubes alternately arranged with respect to the tubes of said first set of tubes,
   (f) each tube of said second set of tubes having an inlet to receive the decomposed oxidant from said catalyst chamber and having at least one outlet for discharging the decomposed oxidant into the combustion chamber.

3. A combustion device comprising
   (a) a combustion chamber including
   (b) a catalyst chamber upstream of the combustion chamber,
   (c) a set of longitudinally extending tubes defining the peripheral wall of the chamber and adapted to receive an oxidant and discharge said oxidant into said catalyst chamber,
   (d) fuel supplying means for said combustion chamber,
   (e) a catalyst unit in said catalyst chamber for decomposing said oxidant, and
   (f) a second set of tubes each having
   (g) an inlet to receive the decomposed oxidant from the catalyst unit and having
   (h) at least one outlet for discharging the decomposed oxidant into the combustion chamber.

4. A combustion device comprising
   (a) a combustion chamber,
   (b) a catalyst chamber upstream of the combustion chamber,
   (c) a plurality of longitudinally extending tubes united side by side to form the periphery of the combustion chamber, and adapted to receive an oxidant and discharge said oxidant into said catalyst chamber, and
   (d) fuel supplying means for said combustion chamber,
   (e) each of said tubes having its side walls abutting those of adjacent tubes and at least one of the abutting pair of side walls of two adjacent tubes being externally provided with a groove,
   (f) the groove cooperating with the other wall of the abutting pair, along the length of the groove, to provide a through-way,
   (g) said through-way having an inlet communicating with said catalyst chamber and having
   (h) at least one outlet opening into said combustion chamber.

5. A combustion device according to claim 4 in which said combustion chamber is provided with a throat and said outlet is inclined in the downstream direction adjacent the throat of the combustion chamber, thereby to encourage cooling adjacent the throat of the combustion chamber.

6. A combustion chamber as claimed in claim 4 in which the through-way contains a pipe extending substantially throughout the length of the through-way.

References Cited in the file of this patent

UNITED STATES PATENTS

| | | |
|---|---|---|
| 1,935,659 | Noack | Nov. 21, 1933 |
| 2,122,521 | Goddard | July 5, 1938 |
| 2,183,313 | Goddard | Dec. 12, 1939 |
| 2,405,722 | Villier | Aug. 13, 1946 |
| 2,569,446 | Bonvillian et al. | Oct. 2, 1951 |
| 2,844,939 | Schultz | July 29, 1958 |

FOREIGN PATENTS

| | | |
|---|---|---|
| 459,924 | Great Britain | Jan. 18, 1937 |
| 618,846 | Great Britain | Feb. 28, 1949 |
| 727,720 | Great Britain | Apr. 6, 1955 |